(12) United States Patent
Howes et al.

(10) Patent No.: US 9,057,278 B2
(45) Date of Patent: Jun. 16, 2015

(54) TURBINE BUCKET INCLUDING AN INTEGRAL ROTATION CONTROLLING FEATURE

(75) Inventors: James Royce Howes, Hermon, ME (US); Mark Kevin Bowen, Schenectady, NY (US); Robert James Bracken, Niskayuna, NY (US); Laurence Scott Duclos, Thorndike, ME (US); Scott Leroy Irwin, Clifton Park, NY (US); Nicholas Andrew Tisenchek, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 489 days.

(21) Appl. No.: 13/591,278

(22) Filed: Aug. 22, 2012

(65) Prior Publication Data
US 2014/0056712 A1 Feb. 27, 2014

(51) Int. Cl.
*F01D 5/30* (2006.01)
*F01D 5/22* (2006.01)

(52) U.S. Cl.
CPC .............. *F01D 5/3038* (2013.01); *F01D 5/225* (2013.01); *Y02E 20/16* (2013.01)

(58) Field of Classification Search
CPC ....... F01D 5/303; F01D 5/3007; F01D 5/225; F05D 2260/36
USPC ..................... 416/193 A, 239, 248
See application file for complete search history.

(56) References Cited

U.S. PATENT DOCUMENTS

| 5,509,784 A | 4/1996 | Caruso et al. |
| 5,580,218 A * | 12/1996 | Nguyen et al. ............... 416/215 |
| 6,761,537 B1 * | 7/2004 | Shapiro et al. ............ 416/220 R |
| 6,827,554 B2 | 12/2004 | Caruso et al. |
| 7,946,822 B2 | 5/2011 | Slepski et al. |
| 8,608,446 B2 * | 12/2013 | Pickens et al. ............... 416/215 |
| 2009/0246029 A1 * | 10/2009 | Saito et al. .................. 416/215 |
| 2010/0166557 A1 * | 7/2010 | Howes ......................... 416/183 |

* cited by examiner

*Primary Examiner* — Ninh H Nguyen
(74) *Attorney, Agent, or Firm* — Ernest G. Cusick; Hoffman Warnick LLC

(57) ABSTRACT

A turbine bucket including an integral rotation controlling feature is disclosed. In one embodiment, a turbine bucket includes: a blade section having an inner radial end and an outer radial end; an integral cover section connected to the outer radial end of the blade section; and a base section for engaging a rotor body, the base section connected to the inner radial end, wherein the base section includes: a central body; a set of tangs extending axially from the central body; a set of flanges radially inboard of the set of tangs and extending axially from the central body; and an integral rotation controlling feature extending from the central body, wherein the rotation controlling feature engages a radial opening in the rotor body. The integral rotation controlling feature is sized to limit rotation of the base section, when the turbine bucket is engaged with a rotor body.

15 Claims, 5 Drawing Sheets

TURBINE BUCKET INCLUDING AN INTEGRAL ROTATION CONTROLLING FEATURE

TECHNICAL FIELD

The subject matter disclosed herein relates to turbines, and more particularly, to turbine buckets having integral covers or shrouds.

BACKGROUND OF THE INVENTION

Some power plant systems, for example certain nuclear, simple cycle and combined cycle power plant systems, employ turbines in their design and operation. Some of these turbines include rotors (e.g., drum-style rotor, wheel/diaphragm-style rotor, etc.) employing a plurality of tangential dovetail blades. These blades (or "buckets") are installed circumferentially about the rotor via an entry slot in the rotor body. Additionally, a plurality of stages (or rows) of blades may be present in any particular design.

In some styles of bucket design, integral covers or shrouds at the opposite end from the dovetail of the turbine buckets are intended to maintain contact from bucket to bucket in a row, to dampen vibratory stimuli and control natural frequencies during operation of the turbine. The integral covers of the turbine buckets are typically designed such that there is an initial pretwist or preloading of the turbine bucket covers and blades, in order to control these vibrational characteristics. The dovetail features and rotor interface must provide reaction to this rotational force.

BRIEF DESCRIPTION OF THE INVENTION

A turbine bucket including an integral rotation controlling feature is disclosed. In one embodiment, a turbine bucket includes: a blade section having an inner radial end and an outer radial end; an integral cover section connected to the outer radial end of the blade section; and a base section for engaging a rotor body, the base section connected to the inner radial end, wherein the base section includes: a central body; a set of tangs extending axially from the central body; a set of flanges radially inboard of the set of tangs and extending axially from the central body; and an integral rotation controlling feature extending from the central body, wherein the rotation controlling feature engages a radial opening in the rotor body. The integral rotation controlling feature is sized to limit rotation of the base section, when the turbine bucket is engaged with a rotor body.

A first aspect of the disclosure provides a turbine bucket, comprising: a blade section having an inner radial end and an outer radial end; an integral cover section connected to the outer radial end of the blade section; and a base section for engaging a rotor body, the base section connected to the inner radial end, wherein the base section includes: a central body; a set of tangs extending axially from the central body; a set of flanges radially inboard of the set of tangs and extending axially from the central body; and a rotation controlling feature extending from the central body, wherein the rotation controlling feature engages a radial opening in the rotor body.

A second aspect provides a rotor wheel assembly, comprising: a rotor body comprising a continuous dovetail slot around the rotor body; and a plurality of turbine buckets, each turbine bucket comprising: a blade section having an inner radial end and an outer radial end; an integral cover section connected to the outer radial end of the blade section; and a base section for engaging a portion of the continuous dovetail slot in the rotor body, the base section connected to the inner radial end, wherein the base section includes: a central body; a set of tangs extending axially from the central body; a set of flanges radially inboard of the set of tangs and extending axially from the central body; and a rotation controlling feature extending from the central body, wherein the rotation controlling feature engages a radial opening in the rotor body.

A third aspect provides a turbine, comprising: a plurality of rotor wheel assemblies, each rotor wheel assembly comprising: a rotor body comprising a plurality of dovetail slots, the at least one slot including a plurality of openings; and a turbine bucket, the bucket comprising: a blade section having an inner radial end and an outer radial end; an integral cover section connected to the outer radial end of the blade section; and a base section for engaging the at least one slot in the rotor body, the base section connected to the inner radial end, wherein the base section includes: a central body; a set of tangs extending axially from the central body; a set of flanges radially inboard of the set of tangs and extending axially from the central body; and a rotation controlling feature extending from the central body, wherein the rotation controlling feature engages a radial opening in the rotor body.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

Figure 1:
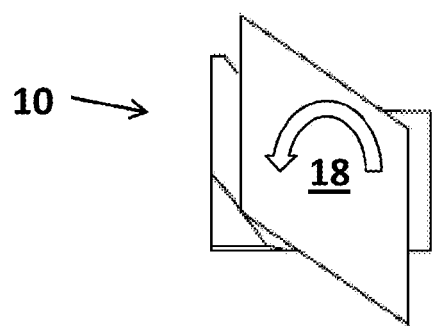
FIG. 1 shows a cut-away schematic view of a turbine bucket according to embodiments of the invention.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated, the subject matter disclosed herein relates to turbines, and more particularly, to turbine buckets having integral covers or shrouds.

Some power plant systems, for example certain nuclear, simple cycle and combined cycle power plant systems, employ turbines in their design and operation. Some of these turbines include rotors (e.g., drum-style rotor, wheel/diaphragm-style rotor, etc.) employing a plurality of tangential dovetail blades. These blades (or "buckets") are installed circumferentially about the rotor via an entry slot in the rotor body. Additionally, a plurality of stages (or rows) of blades may be present in any particular design.

In some styles of bucket design, integral covers or shrouds at the opposite end from the dovetail of the turbine buckets are intended to maintain contact from bucket to bucket in a row, to dampen vibratory stimuli and control natural frequencies during operation of the turbine. The integral covers of the turbine buckets are typically designed such that there is an initial pretwist or preloading of the turbine bucket covers and blades, in order to control these vibrational characteristics. The dovetail features and rotor interface must provide reaction to this rotational force.

During development and testing of "T-root" style (e.g., where the base of the turbine bucket forms a "T" shape) integrally covered turbine buckets, an issue was found where the integral cover pretwist and the normal assembly forces caused the dovetails to react and twist more than desired. This prevented proper assembly, and also, proper dampening of vibration characteristics.

Aspects of the invention provide for an integrally covered turbine bucket including an integral rotation controlling feature. In one embodiment, a turbine bucket includes: a blade section having an inner radial end and an outer radial end; an integral cover section connected to the outer radial end of the blade section; and a base section for engaging a rotor body, the base section connected to the inner radial end, wherein the base section includes: a central body; a set of tangs extending axially from the central body; a set of flanges radially inboard of the set of tangs and extending axially from the central body; and an integral rotation controlling feature extending from the central body, wherein the rotation controlling feature engages a radial opening in the rotor body. The integral rotation controlling feature is sized to limit rotation of the base section, when the turbine bucket is engaged with a rotor body. As will be described herein, the integral rotation controlling feature extends from the central body of the base section and counters the integral cover twist and normal assembly forces that cause the rotor body gouging.

Figure 2:
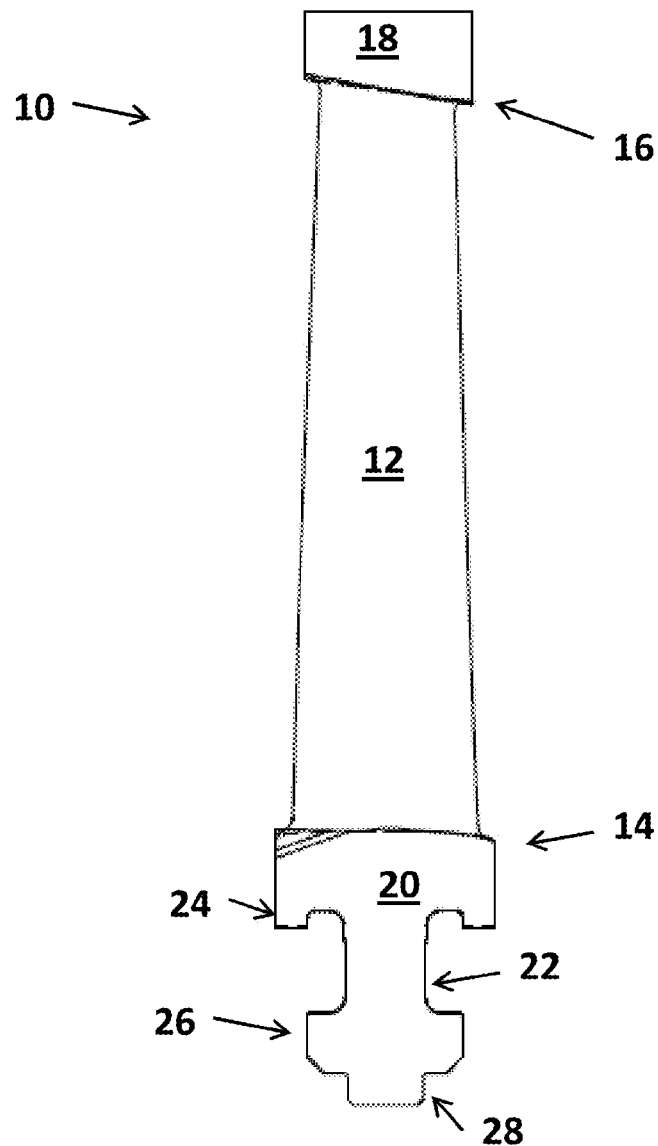
FIG. 2 shows a cut-away schematic view of a turbine bucket according to embodiments of the invention.
Figure 5:
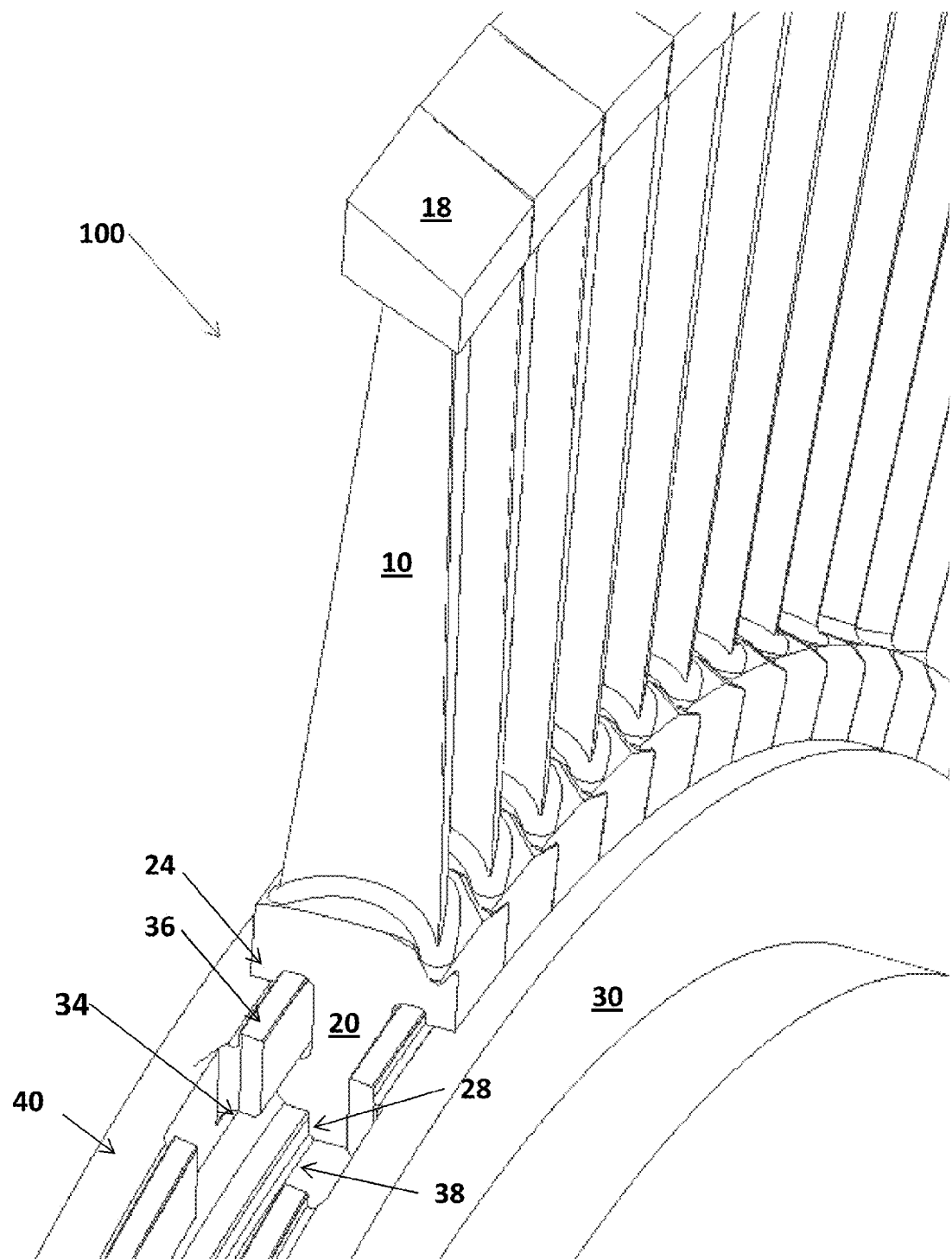
FIG. 5 shows a partial perspective view of a rotor wheel assembly according to embodiments of the invention.

Turning now to FIGS. 1 and 2, a top view of a turbine bucket 10 (i.e., the integral cover 18) and a cut-away schematic view of a turbine bucket 10 according to an embodiment of the invention are, respectively, shown. FIG. 1 shows the direction of the integral cover pretwist, which is desired for proper cover coupling and proper dampening of vibration characteristics. Turning now to FIG. 2, the turbine bucket 10 includes a blade section 12 that has an inner radial end 14 and an outer radial end 16. When assembled on a rotor body (FIG. 5), a plurality of turbine buckets 10 may form several rows of buckets around a rotor body 30 (FIG. 5). Each row of turbine buckets 10 is coupled together by the integral cover 18 (i.e., shroud) that covers all of the turbine buckets 10 in that row and partially twists each turbine bucket 10 as depicted in FIG. 1. Therefore, each turbine bucket 10 includes an integral cover section 18 that is connected to the blade section 12 at the outer radial end 16.

Referring back to FIG. 2, at the inner radial end 14 of the blade section 12 of the turbine bucket 10 is a base section 20. The base section 20 includes a central body 22. At a radial outboard portion, a set of tangs 24 (e.g., flanges, hooks, etc.) extend axially from the central body 22. At a radial inboard portion, a set of flanges 26 (e.g., hooks, tangs, etc) extend axially from the central body 22. At the radial inboard portion of the central body 22, a rotation controlling feature 28 (i.e., a radial protrusion 28) extends radially inward from the central body 22. Although the radial protrusion 28, as shown in FIG. 2 (and FIG. 3), takes the form of a square, it is understood that the radial protrusion 28 may be a rectangle, a half circle, or any other shape.

Figure 3:
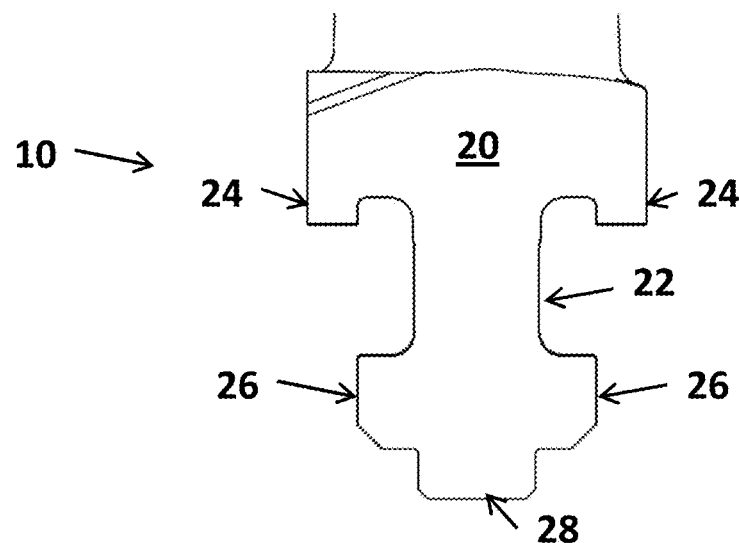
FIG. 3 shows a cut-away schematic view of a base section of a turbine bucket and a dovetail slot of a rotor body according to embodiments of the invention.
Figure 4:
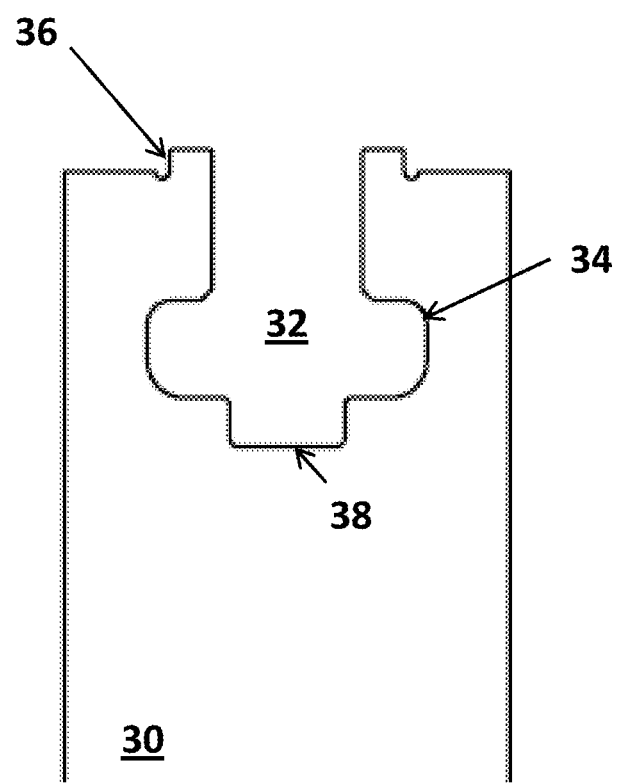
FIG. 4 shows a cut-away schematic view of a base section of a turbine bucket and a dovetail slot of a rotor body according to embodiments of the invention.

Turning now to FIGS. 3 and 4, a partial cross-section view of a base section 20 of a turbine bucket 10 and a partial cross section view of a rotor body 30 are, respectively, shown. As seen in FIG. 4, each dovetail slot 32 in rotor body 30 includes a plurality of openings. For example, dovetail slot 32 includes axial openings 34. Axial openings 34 are adapted to engage the set of flanges 26 extending axially from the central body 22 of the base section 20. To further secure the turbine bucket 10 to the rotor body, each tang 24 in the set of tangs 24 may be adapted to engage a protrusion 36. Each protrusion 36 extends radially outward from a surface of the rotor body 30.

Dovetail slot 32 also includes a radial opening 38 extending circumferentially around the rotor body 30. The radial opening 38 is adapted to engage the radial protrusion 28 of the base section 20 of turbine bucket 10. The radial protrusion 28 is sized such that movement of the base section 20 is limited when engaged within the radial opening 38 of the rotor body 30. Therefore, gouging of the rotor body 30 that is caused by the integral cover pretwist and assembly forces is avoided. The interface between this radial protrusion 28 and the radial opening 38 is of sufficient axial tightness as to control twist of the overall bucket dovetail 20 in reaction to assembly and/or operating forces transmitted from the cover 18 and/or turbine bucket 10.

Turning now to FIG. 5, a partial perspective view of portions of a turbine 100 including turbine buckets 10, and a rotor body 30, according to embodiments of the invention is shown. In this embodiment, turbine buckets 10, as described above in FIG. 2 and FIG. 3, extend radially from the rotor body 30. The rotor body 30 may include a plurality of stages 40. Each dovetail slot 32 (FIG. 4) of rotor body 30 is adapted to engage the base section 20 of the turbine buckets 10. For example, in this embodiment shown, the base section 20 of the turbine bucket 10 is in the form of an inverted "T". Therefore, the dovetail slot 32 in the rotor body 30 includes a substantially complementary shape to the base section 20 of the turbine bucket 10 in order to secure the turbine bucket 10 to the rotor body 30. That is, as mentioned above, the dovetail slot 32 of the rotor body 30 includes a set of axial openings 34, a set of protrusions 36, and a radial opening 38 to, respectively, engage a set of flanges 26, a set of tangs 24, and a radial protrusion 28 of the turbine bucket 10 in order to secure the turbine bucket 10.

Figure 6:
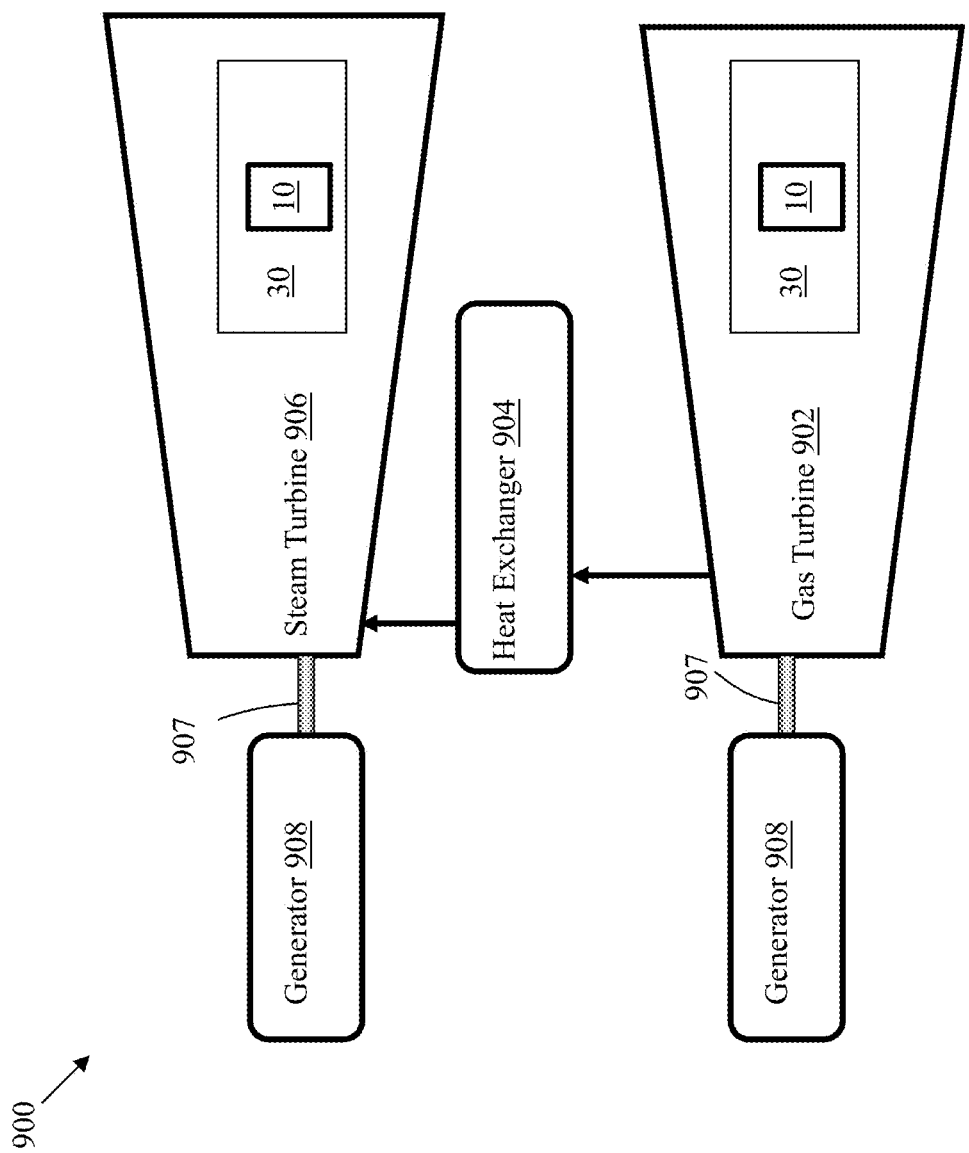
FIG. 6 shows a schematic block diagram illustrating portions of a combined cycle power plant system according to embodiments of the invention.

Turning to FIG. 6, a schematic view of portions of a multi-shaft combined cycle power plant 900 is shown. Combined cycle power plant 900 may include, for example, a gas turbine 902 operably connected to a generator 908. Generator 908 and gas turbine 902 may be mechanically coupled by a shaft 907, which may transfer energy between a drive shaft (not shown) of gas turbine 902 and generator 908. Also shown in FIG. 6 is a heat exchanger 904 operably connected to gas turbine 902 and a steam turbine 906. Heat exchanger 904 may be fluidly connected to both gas turbine 902 and a steam turbine 906 via conventional conduits (numbering omitted). Gas turbine 902 and/or steam turbine 906 may include rotor body 30 and/or turbine bucket 10 of FIGS. 1-5 or other embodiments described herein. Heat exchanger 904 may be a conventional heat recovery steam generator (HRSG), such as those used in conventional combined cycle power systems. As is known in the art of power generation, HRSG 904 may use hot exhaust from gas turbine 902, combined with a water supply, to create steam which is fed to steam turbine 906. Steam turbine 906 may optionally be coupled to a second generator system 908 (via a second shaft 907). It is understood that generators 908 and shafts 907 may be of any size or type known in the art and may differ depending upon their application or the system to which they are connected. Common numbering of the generators and shafts is for clarity and does not necessarily suggest these generators or shafts are identical.

Figure 7:
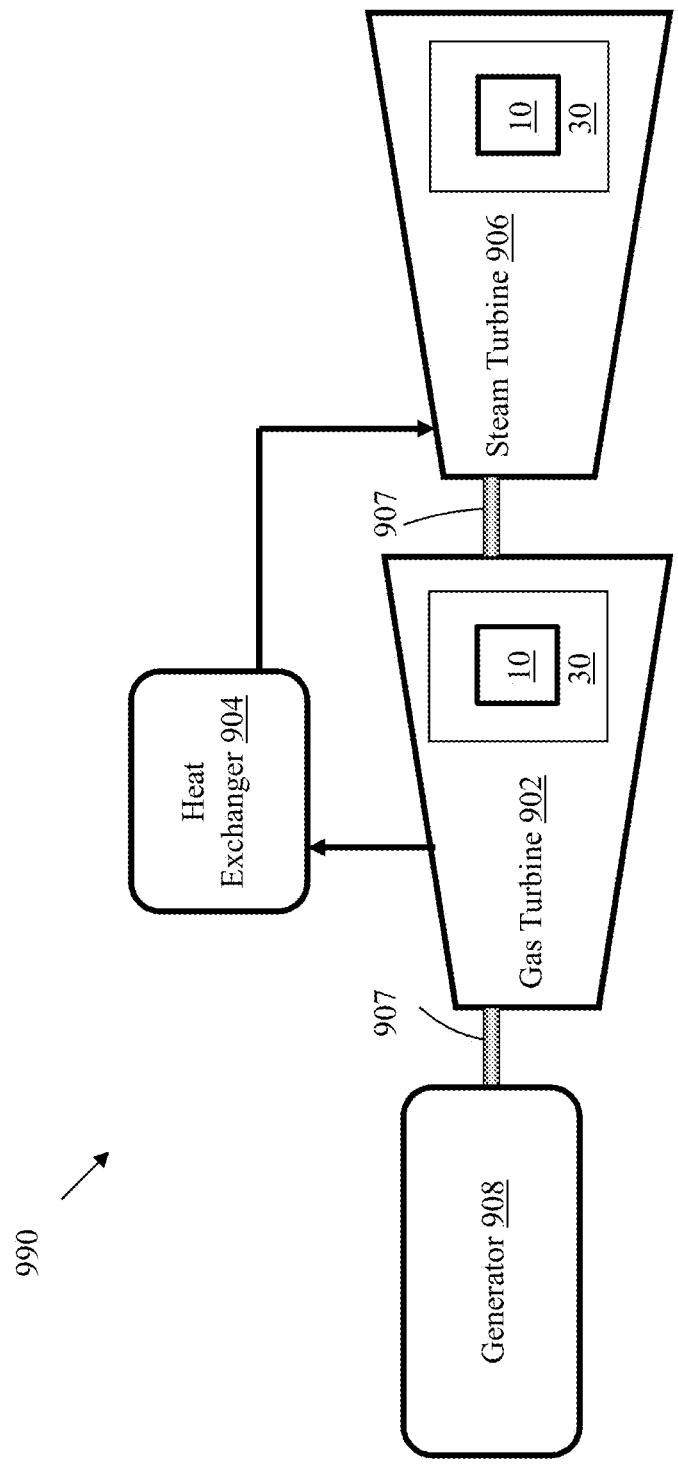
FIG. 7 shows a schematic block diagram illustrating portions of a single-shaft combined cycle power plant system according to embodiments of the invention.

In another embodiment, shown in FIG. 7, a single shaft combined cycle power plant 990 may include a single generator 908 coupled to both gas turbine 902 and steam turbine 906 via a single shaft 907. Steam turbine 906 and/or gas turbine 902 may include rotor body 30 and/or turbine bucket 10 of FIGS. 1-5 or other embodiments described herein.

The turbine blades and rotors of the present disclosure are not limited to any one particular turbine, power generation system or other system, and may be used with other power generation systems and/or systems (e.g., combined cycle, simple cycle, nuclear reactor, etc.). Additionally, the turbine buckets of the present invention may be used with other systems not described herein that may benefit from the integral rotation controlling feature described herein.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbine bucket, comprising:
    a blade section having an inner radial end and an outer radial end;
    an integral cover section connected to the outer radial end of the blade section; and
    a base section for engaging a rotor body, the base section connected to the inner radial end, wherein the base section includes:
        a central body;
        a set of tangs extending axially from the central body, wherein an axial end of each tang in the set of tangs includes a tang protrusion extending radially inward from the axial end of each tang, the tang protrusion configured to engage a rotor protrusion extending radially outward from a surface of a rotor;
        a set of flanges radially inboard of the set of tangs and extending axially from the central body; and
        a rotation controlling feature extending from the central body, wherein the rotation controlling feature engages a radial opening in the rotor body.

2. The turbine bucket of claim 1, wherein the rotation controlling feature is sized to limit movement of the base section when engaged with the radial opening in the rotor body.

3. The turbine bucket of claim 2, wherein the rotation controlling feature is a radial protrusion integral to the base section of the turbine bucket.

4. The turbine bucket of claim 1, wherein each flange in the set of flanges engages an axial opening in the rotor body.

5. A rotor wheel assembly, comprising:
    a rotor body comprising a continuous dovetail slot around the rotor body and a rotor protrusion extending radially outward from a surface of the rotor body; and
    a plurality of turbine buckets, each turbine bucket comprising:
        a blade section having an inner radial end and an outer radial end;
        an integral cover section connected to the outer radial end of the blade section; and
        a base section for engaging a portion of the continuous dovetail slot in the rotor body, the base section connected to the inner radial end, wherein the base section includes:
            a central body;
            a set of tangs extending axially from the central body, wherein an axial end of each tang in the set of tangs includes a tang protrusion extending radially inward from the axial end of each tang, the tang protrusion configured to engage the rotor protrusion;
            a set of flanges radially inboard of the set of tangs and extending axially from the central body; and
            a rotation controlling feature extending from the central body, wherein the rotation controlling feature engages a radial opening in the rotor body.

6. The rotor wheel assembly of claim 5, wherein the rotation controlling feature is sized to limit movement of the base section when engaged with the radial opening in the rotor body.

7. The rotor wheel assembly of claim 6, wherein the rotation controlling feature is a radial protrusion integral to the base section of the turbine bucket.

8. The rotor wheel assembly of claim 7, wherein the radial opening extends circumferentially around the rotor body.

9. The rotor wheel assembly of claim 5, wherein each flange in the set of flanges engages an axial opening in the rotor body.

10. The rotor wheel assembly of claim 9, wherein the axial openings extend circumferentially around the rotor body.

11. The rotor wheel assembly of claim 7, wherein the rotor protrusion also extends circumferentially around the rotor body.

12. A turbine, comprising:
    a plurality of rotor wheel assemblies, each rotor wheel assembly comprising:
        a rotor body comprising a rotor protrusion extending radially outward from a surface of the rotor body and a plurality of dovetail slots, wherein at least one dovetail slot in the plurality of dovetail slots includes a plurality of openings; and
        a turbine bucket, the bucket comprising:
            a blade section having an inner radial end and an outer radial end;
            an integral cover section connected to the outer radial end of the blade section; and a base section for engaging the at least one dovetail slot in the rotor body, the base section connected to the inner radial end, wherein the base section includes:
 a central body;
 a set of tangs extending axially from the central body, wherein an axial end of each tang in the set of tangs includes a tang protrusion extending radially inward from the axial end of each tang, the tang protrusion configured to engage the rotor protrusion;
 a set of flanges radially inboard of the set of tangs and extending axially from the central body; and
 a rotation controlling feature extending from the central body, wherein the rotation controlling feature engages a radial opening in the rotor body.

13. The turbine of claim 12, wherein the rotation controlling feature is seized to limit movement of the base section when engaged with the radial opening in the rotor body.

14. The turbine of claim 13, wherein the rotation controlling feature is a radial protrusion integral to the base section of the turbine bucket.

15. The turbine of claim 12, wherein each flange in the set of flanges engages an axial opening in the rotor body.

* * * * *